Aug. 23, 1955 — A. FRITZ — 2,715,772

DENTAL BURR

Filed July 15, 1950

INVENTOR
ADOLF FRITZ
BY

United States Patent Office 2,715,772  
Patented Aug. 23, 1955

2,715,772
DENTAL BURR

Adolf Fritz, Dresden, Germany, assignor to Frico G. m. b. H., Gold- und Silber-Scheide Anstalt, Munich, Germany Application July 15, 1950, Serial No. 174,042

3 Claims. (Cl. 32—48)

This invention relates to a dental burr for drilling root canals.

When burrs possessing longitudinal grooves are employed experience has shown that the grooves become rapidly clogged, so that the tool is heated or does not satisfactorily work any more and has to be replaced by a new one. This involves an undesirable extension of the boring process and thus takes up the patient's time for an unnecessarily long period. Furthermore, the burrs become blunted very soon and have to be returned to the factory for resharpening, with the result that due to such resharpening the effective length of the cutting edges shortens and the diameter of the tool decreases. Repeated resharpening operations necessarily lead to the drilling of root canals which will no longer conform to the root pin to be inserted, which makes it necessary to file the root pin to fit it to the canal.

The object of the invention is to provide a burr for use in connection with slightly tapered conical root pins, whereby the disadvantages mentioned are overcome.

According to the invention, the drill proper of the burr possesses cutting edges, portions of which extend parallel to the axis of the tool and which, when rotating, trace a cylindrical surface, and adjoining portions of which taper slightly toward the point of the tool and, when rotating, trace a conical surface.

The cross section taken in any plane throughout the length of the cutting edges forms a regular polygon, preferably a regular triangle. The lateral faces between the cutting edges are preferably hollow-ground, i. e. concave.

There are reamers for root canals known whose cross section forms a regular triangle and whose faces between the cutting edges are concave, but these cutting edges extend partly spirally. These edges are not constructed in such manner that, during rotation, their upper portions describe the peripheral surface of a cylinder, and their lower portions that of a cone.

Such instruments are therefore not suited for excavating a slightly tapered conical root canal which will always, that is, after resharpening of the tools, be true in size to the root pin to be inserted.

The burr according to the invention, on the other hand, may be reground at will be any practitioner using an oil stone or the like without altering the total length of the slightly tapered conical cutting portion of the burr, which determines the fit of the root pin subsequently to be inserted.

According to the invention, the cutting faces of the burr as has already been indicated, are preferably hollow-ground, whereby the cutting effect is increased without depriving the practitioner of the possibility of regrinding the tool himself. The boring or cutting effect of the new tool is further enhanced by giving the front end thereof the form of an obtuse-angled pyramid.

One embodiment of the invention is illustrated by way of example in the accompanying drawing, wherein Fig. 1 is an elevational view of a dental burr embodying features of my invention;

Figure 1:
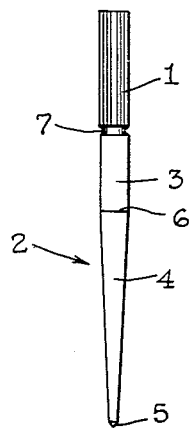
Figure 2:
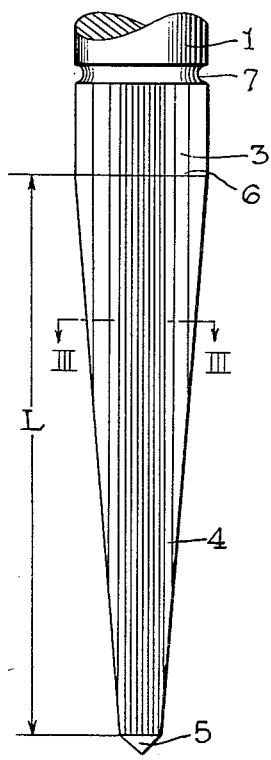
Fig. 2 is a fragmentary view similar to that of Fig. 1 but drawn to enlarged scale.

Referring to the drawing in greater detail, and initially to Fig. 1, the burr consists of a shank 1 and the drill proper generally identified by 2 and comprising a portion 3, a portion 4, and a point 5. The portions 3 and 4 and the point 5 are provided with cutting edges. The cutting edges of the portion 3 extend parallel to the axis of the tool, the cutting edges of the portion 4 taper toward the point 5, the point 5 forming an obtuse-angled pyramid. Two adjoining cutting edges of the portions 3 and 4 form an angle at a point of a polygon at 6 and lie in a plane through the axis of the burr. Between the shank 1 and the drill proper which is designated 2, there is a groove 7 provided for the complete discharge of the particles excavated out of the root.

Figure 3:
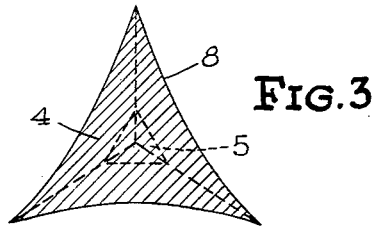
Fig. 3 is a section taken in the plane of the line 3—3 of Fig. 2.

In Fig. 3, the faces 8 between the cutting edges of the portion 4 are shown to be hollow or concave.

Figure 4:
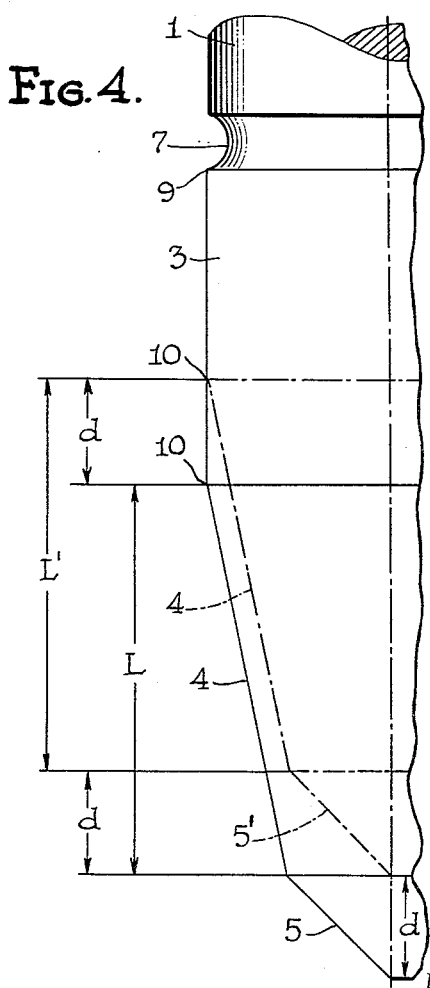
Fig. 4 illustrates my burr before and after a number of regrinding operations.

As can be seen from Fig. 4, a plurality of regrinding operations gradually imparts to the original burr shown in solid lines the dash-dotted line shape. With the edges of the portion 4 slowly assuming the dash-dotted line shape 4', the edges of the portion 3 shorten to extend between the points 9 and 10', as distinguished from the original extent between the points 9 and 10. The pyramid 5 takes the position designated 5'. The length L of the cutting edges which is decisive to ensure an accurate fit of the root pins, as well as their diameter, remain the same. All that happens, is a shift of the length L to L' by the distance d.

I claim:

1. Dental burr for drilling root canals always true in size to slightly tapered root pins to be inserted, said burr comprising a shank, and a drill proper, said drill including two portions, one portion being provided with cutting edges extending substantially parallel to the axis of the burr through a part of the drill length, the other of said portions being provided with cutting edges forming continuations of the first named cutting edges and tapering slightly toward the point of the drill, adjoining cutting edges of both portions extending in a plane through the axis of the burr, cross sections taken in any plane through the drill portions forming a regular polygon.

2. In the burr according to claim 1, the cross section taken in any plane through the drill portions forming an equilateral triangle.

3. In the burr according to claim 1, hollow ground faces between the cutting edges of both of said drill portions.

References Cited in the file of this patent

UNITED STATES PATENTS

| 220,911 | Cogswell | Oct. 28, 1879 |
| 414,995 | Richmond | Nov. 12, 1889 |
| 512,856 | Beebe | Jan. 16, 1894 |
| 732,922 | Clark | July 7, 1903 |
| 2,586,084 | Powell | Feb. 19, 1952 |

FOREIGN PATENTS

| 15,509 | Great Britain | Nov. 25, 1884 |

OTHER REFERENCES

Jota Catalog, Jota-Works Funke Bros. Ltd., Dusseldorf, Germany, page 10, item 189. (In Div. 55.)